United States Patent
Murase et al.

(10) Patent No.: US 8,902,161 B2
(45) Date of Patent: Dec. 2, 2014

(54) DEVICE AND METHOD FOR DETECTING FINGER POSITION

(71) Applicant: Fujitsu Limited, Kawasaki (JP)

(72) Inventors: Taichi Murase, Kawasaki (JP); Nobuyuki Hara, Meguro (JP); Atsunori Moteki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 13/669,705

(22) Filed: Nov. 6, 2012

(65) Prior Publication Data

US 2013/0181904 A1 Jul. 18, 2013

(30) Foreign Application Priority Data

Jan. 12, 2012 (JP) ................................ 2012-004010

(51) Int. Cl.
G06F 3/02 (2006.01)

(52) U.S. Cl.
USPC .......................................... 345/156; 345/175

(58) Field of Classification Search
None
See application file for complete search history.

(56) References Cited

U.S. PATENT DOCUMENTS

| | | | |
|---|---|---|---|
| 6,614,422 B1 * | 9/2003 | Rafii et al. | 345/168 |
| 8,119,106 B2 * | 2/2012 | Tamarkin et al. | 424/45 |
| 8,358,342 B2 * | 1/2013 | Park | 348/143 |
| 2002/0060669 A1 * | 5/2002 | Sze | 345/173 |
| 2003/0048260 A1 * | 3/2003 | Matusis | 345/173 |
| 2004/0046744 A1 * | 3/2004 | Rafii et al. | 345/168 |
| 2005/0024324 A1 * | 2/2005 | Tomasi et al. | 345/156 |
| 2006/0244720 A1 * | 11/2006 | Tracy | 345/156 |
| 2007/0035521 A1 * | 2/2007 | Jui et al. | 345/168 |
| 2007/0115261 A1 * | 5/2007 | Cho et al. | 345/168 |
| 2007/0159453 A1 * | 7/2007 | Inoue | 345/156 |
| 2009/0019990 A1 * | 1/2009 | Chien et al. | 84/478 |
| 2009/0102788 A1 * | 4/2009 | Nishida et al. | 345/158 |
| 2009/0217191 A1 * | 8/2009 | Shin et al. | 715/773 |
| 2009/0262098 A1 * | 10/2009 | Yamada | 345/175 |
| 2010/0142830 A1 * | 6/2010 | Yahata | 382/209 |
| 2010/0177035 A1 * | 7/2010 | Schowengerdt et al. | 345/156 |
| 2010/0239154 A1 * | 9/2010 | Fujimori et al. | 382/141 |
| 2010/0272366 A1 * | 10/2010 | Meng et al. | 382/190 |
| 2011/0102570 A1 * | 5/2011 | Wilf et al. | 348/77 |
| 2011/0148770 A1 * | 6/2011 | Adamson et al. | 345/173 |
| 2011/0235902 A1 * | 9/2011 | Chittar et al. | 382/162 |
| 2011/0291988 A1 * | 12/2011 | Bamji et al. | 345/175 |
| 2012/0027252 A1 * | 2/2012 | Liu et al. | 382/103 |
| 2012/0069169 A1 * | 3/2012 | Dejima | 348/77 |
| 2012/0087543 A1 * | 4/2012 | Choi et al. | 382/103 |
| 2012/0216114 A1 * | 8/2012 | Privault et al. | 715/702 |

FOREIGN PATENT DOCUMENTS

JP 2003-288156 10/2003

* cited by examiner

*Primary Examiner* — Sumati Lefkowitz
*Assistant Examiner* — Josemarie G Acha, III
(74) *Attorney, Agent, or Firm* — Staas & Halsey LLP

(57) ABSTRACT

A finger position detection device includes a processor; and a memory which stores a plurality of instructions, which when executed by the processor, cause the processor to execute, detecting a hand region that includes a plurality of fingers from an image captured by an image capturing unit that captures an image of the plurality of fingers from in front of the fingers; dividing a first region that is at least a part of the hand region into a plurality of first cells of a first size and extracting, from each of the plurality of first cells, a first feature value that represents a feature of a position of one of the plurality of fingers in a depth direction with respect to the image capturing unit; dividing a second region that is at least a part of the hand region into a plurality of second cells of a second size.

10 Claims, 15 Drawing Sheets

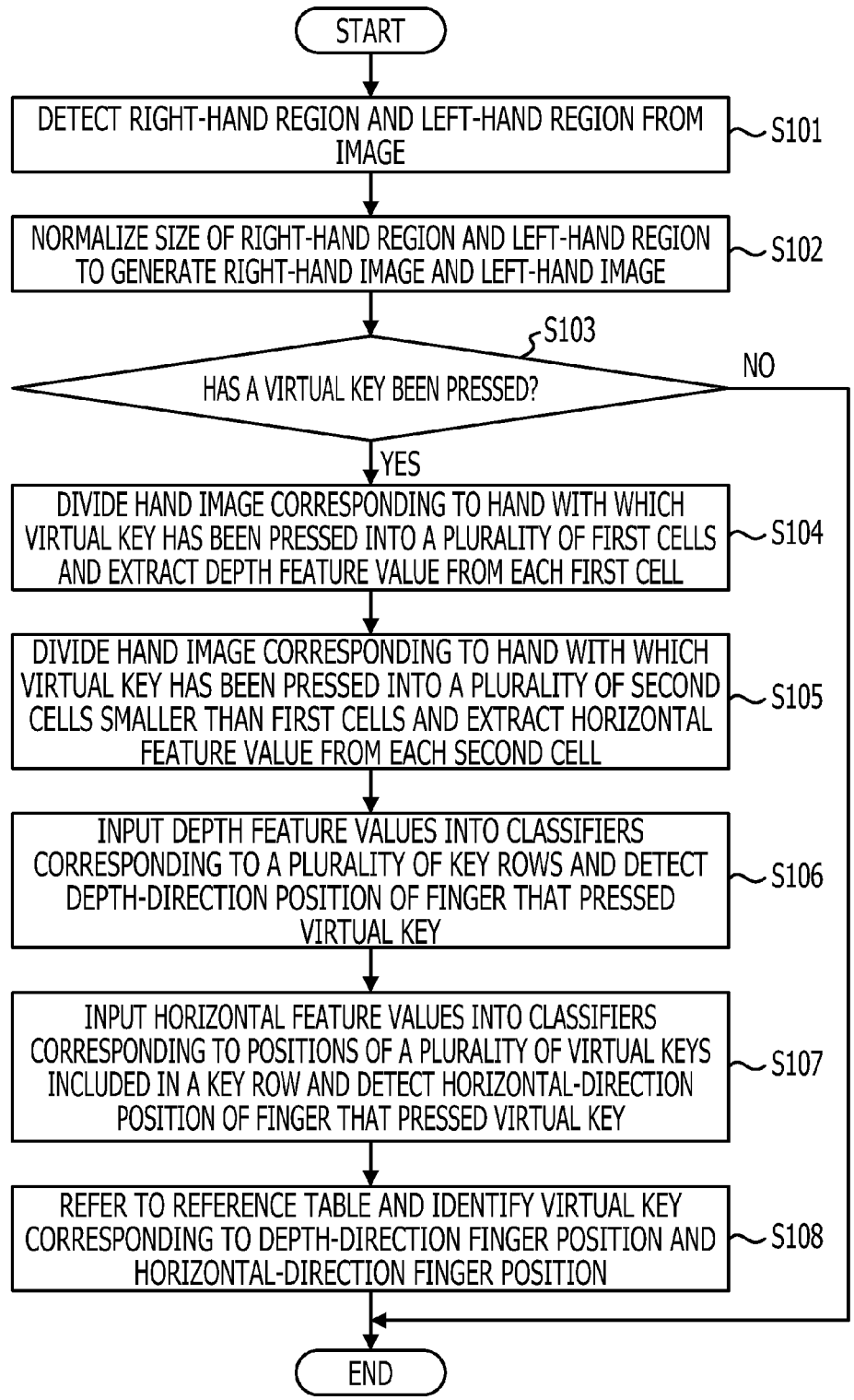

DEVICE AND METHOD FOR DETECTING FINGER POSITION

CROSS-REFERENCE TO RELATED APPLICATION(S)

This application is based upon and claims the benefit of priority of the prior Japanese Patent Application No. 2012-004010, filed on Jan. 12, 2012, the entire contents of which are incorporated herein by reference.

FIELD

The embodiments discussed herein are related to a device and a method for detecting the position of a finger by, for example, analyzing an image of fingers captured from a specific direction, and a computer-readable recording medium storing a finger position detection computer program.

BACKGROUND

As an input device for a user to input desired information, a keyboard with a plurality of keys is conventionally used. A keyboard provides great convenience for users who input desired information, but is of at least a certain size because the keyboard has a plurality of keys that are of a user-operable size. For example, a keyboard that has a QWERTY layout has at least 26 keys that correspond to each letter of the alphabet. However, in a mobile terminal such as a smart phone, since space for an input device is limited, an input device that is small in size is desirable. In such a mobile terminal, in order to reduce the size of an input device or increase an information display area on a touch panel into which an input device and a display device are integrated, the number of keys that may be operated at the same time is reduced. Reducing the number of keys means that a single key corresponds to a number of pieces of input information and therefore the number of key presses for a user to input given information increases. As a result, usability decreases.

Japanese Laid-open Patent Publication No. 2003-288156 discloses an input device that detects the position of a fingertip of an operator who operates a virtual keyboard with virtual keys arranged in a given keyboard layout and then generates a key code corresponding to one of the virtual keys where the fingertip was detected. With this input device, a digital video camera that records the operator's fingertips from the top and a digital video camera that records operator's fingertips from the front are used to detect the position of the operator's fingertips.

SUMMARY

According to an aspect of the embodiments, a finger position detection device includes a processor; and a memory which stores a plurality of instructions, which when executed by the processor, cause the processor to execute, detecting a hand region that includes a plurality of fingers from an image captured by an image capturing unit that captures an image of the plurality of fingers from in front of the fingers; dividing a first region that is at least a part of the hand region into a plurality of first cells of a first size and extracting, from each of the plurality of first cells, a first feature value that represents a feature of a position of one of the plurality of fingers in a depth direction with respect to the image capturing unit; dividing a second region that is at least a part of the hand region into a plurality of second cells of a second size smaller than the first size and extracting, from each of the plurality of second cells, a second feature value that represents a feature of a position of one of the plurality of fingers in a finger arrangement axis along which the plurality of fingers are arranged; detecting a finger position in the depth direction by inputting the first feature value into a first classifier that represents a relationship between the first feature value and a finger position in the depth direction; and detecting a finger position in the finger arrangement axis by inputting the second feature value into a second classifier that represents a relationship between the second feature value and a finger position in the finger arrangement axis.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 7 is a flowchart illustrating a finger position detection process;

DESCRIPTION OF EMBODIMENTS

A finger position detection device according to an embodiment of the present disclosure will be described below with reference to the accompanying drawings. This finger position detection device analyzes a single image obtained by an image capturing unit to capture the image of a plurality of fingers from in front of the fingers and detects the position of one of these fingers in a depth direction with respect to the image capturing unit and along an axis that the fingers are arranged (hereinafter referred to as finger arrangement axis). The finger position detection device divides a hand region that includes a plurality of fingers in the image into a plurality of first cells and extracts a feature value related to the position of a finger in the depth direction from each of the first cells. In addition, the finger position detection device divides the hand region into a plurality of second cells and extracts a feature value related to the position of a finger in the finger arrangement axis from each of the second cells. The size of a second cell is set to be smaller than the size of a first cell. The finger position detection device inputs the feature value for a finger position in the depth direction into a classifier for identifying a finger position in the depth direction and estimates a finger position in the depth direction. In addition, the finger position detection device inputs the feature value related to a finger position in the finger arrangement axis into a classifier for identifying a finger position along the finger arrangement axis and estimates a finger position along the finger arrangement axis.

In the following embodiments, it is assumed that the palm of a hand whose image is captured by the image capturing unit faces downward. Accordingly, the finger arrangement axis is substantially orthogonal and horizontal to the depth direction. The finger arrangement axis is hereinafter simply referred to as the horizontal axis.

Figure 1:
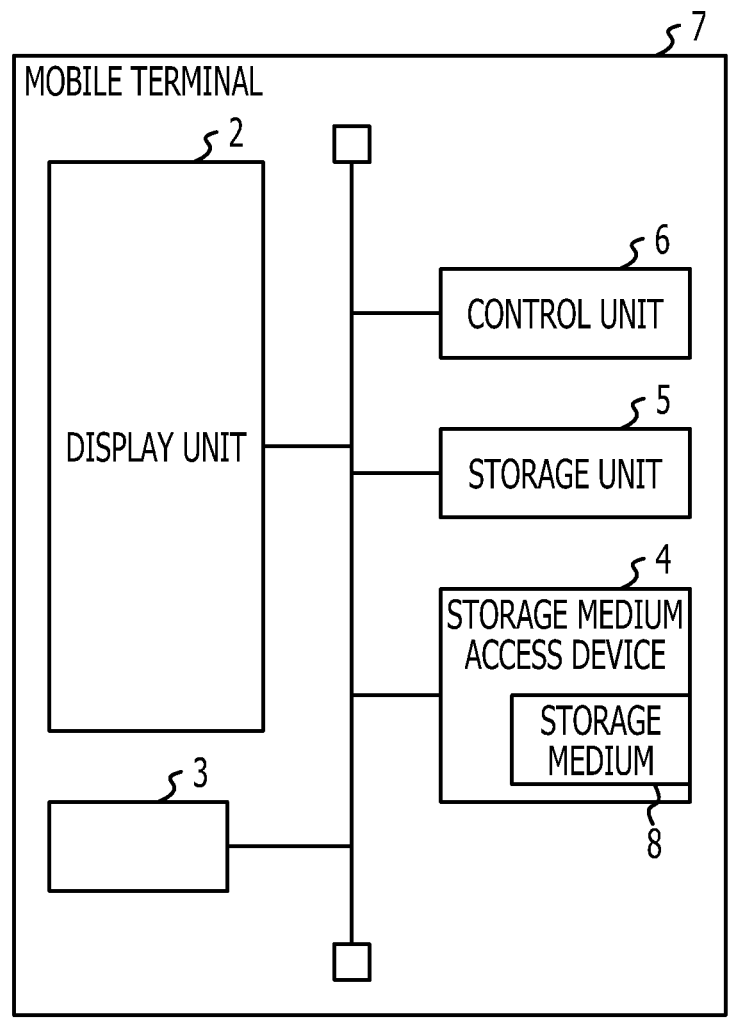
FIG. 1 is a diagram illustrating the hardware configuration of a mobile terminal that includes a finger position detection device and is an example of an input device with a virtual keyboard.

FIG. 1 is a diagram illustrating the hardware configuration of a mobile terminal that includes a finger position detection device and is an example of an input device with a virtual keyboard. A mobile terminal 1 includes a display unit 2, an image capturing unit 3, a storage-medium access device 4, a storage unit 5, and a control unit 6. The display unit 2, the image capturing unit 3, the storage-medium access device 4, the storage unit 5, and the control unit 6 are disposed in a case 7. The mobile terminal 1 is, for example, a mobile telephone, a personal digital assistant, or a tablet computer. The mobile terminal 1 may include a communication interface circuit (not illustrated) used for connection between the mobile terminal 1 and another apparatus. FIG. 1 describes components included in the mobile terminal 1 and does not illustrate the actual layout of each component.

The mobile terminal 1 detects the position of a finger with which one of a plurality of virtual keys included in a virtual keyboard is pressed by causing the control unit 6 to analyze the image of a user's hand captured by the image capturing unit 3, and specifies the virtual key corresponding to the position of the finger. Thereafter, the mobile terminal 1 determines that a key code corresponding to the specified virtual key has been input.

Figure 2:
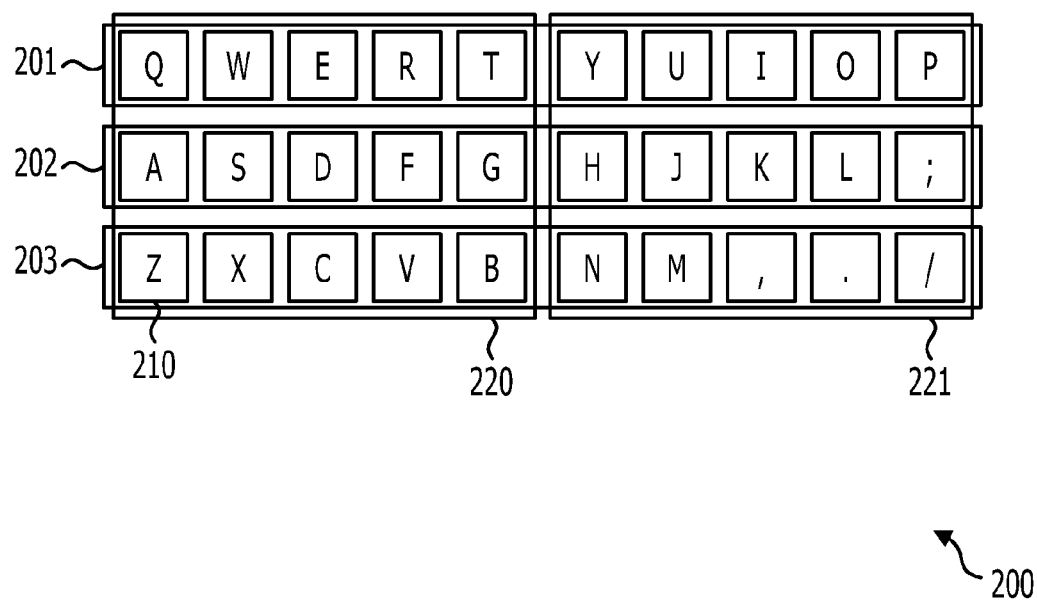
FIG. 2 is a diagram illustrating an example of a key layout of a virtual keyboard.

FIG. 2 is a diagram illustrating an example of a key layout of a virtual keyboard used in this embodiment. A virtual keyboard 200 is a QWERTY keyboard and includes three key rows 201 to 203 that are provided in an ascending order of distance from the mobile terminal 1 along the depth direction. Each key row includes five virtual keys 210 for the left hand and five virtual keys 210 for the right hand. Accordingly, the virtual keyboard 200 has thirty virtual keys. A rectangular region 220 represents the group of virtual keys pressed by the left hand, and a rectangular region 221 represents the group of virtual keys pressed by the right hand.

The display unit 2 is, for example, a liquid crystal display or an organic electroluminescence display, and is placed so that the display screen thereof faces a user who is in front of the case 7. The display unit 2 displays various pieces of information for the user. The display unit 2 may be a display with a touch panel. In this case, the display unit 2 displays various icons or operational buttons that correspond to information input with a virtual keyboard in accordance with a control signal from the control unit 6. When one of the displayed icons is touched by a user, the display unit 2 generates an operational signal based on the position of the touched icon and outputs the operational signal to the control unit 6.

The image capturing unit 3, for example, includes an image sensor in which solid-state image sensors are arranged in a two-dimensional array and an image capturing optical system for forming the image of a subject onto the image sensor.

Figure 3:
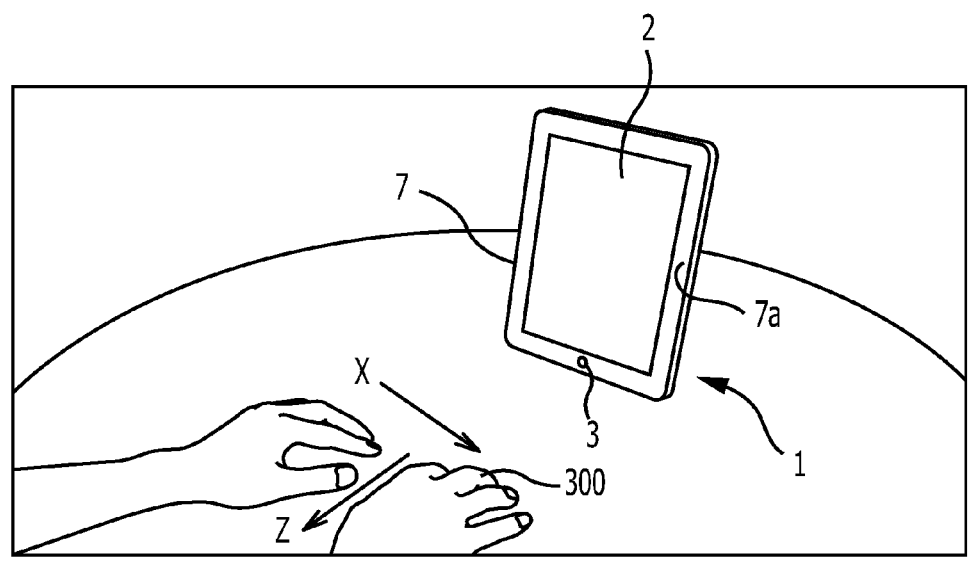
FIG. 3 is a diagram illustrating an example of a positional relationship between a mobile terminal and fingers that are to be detected.

FIG. 3 is a diagram illustrating an example of a positional relationship between the mobile terminal 1 and fingers that are to be detected. As illustrated in FIG. 3, when the mobile terminal 1 is placed on a desk so that the display unit 2 in the mobile terminal 1 faces a user, the image capturing unit 3 is below the display unit 2 on a front surface 7a of the case 7 and faces fingertips 300 of a user's hand on the desk. The image capturing unit 3 may therefore capture the image of user's fingers from in front of the fingers and generates an image of the user's hand that includes the fingertips. In this example, the depth direction represented by an arrow z is substantially parallel to the optical axis of the image capturing unit 3 and the horizontal direction represented by an arrow x is substantially parallel to a plane orthogonal to the optical axis.

The image capturing unit 3 periodically photographs the user's hands that includes fingers, and generates an image. Then the image capturing unit 3 and outputs the generated image to the control unit 6. The periodic interval is preferably set to an amount of time less than an amount of time for a user to press a key, for example, 50 msec to 100 msec.

The storage-medium access device 4 is a device for accessing a storage medium 8 such as a magnetic disk or a semiconductor memory card. The storage-medium access device 4 reads a computer program that is to be executed on the control unit 6 from the storage medium 8 and transmits the read computer program to the control unit 6. As will be described later, when the control unit 6 executes a computer program to function as a finger position detection device, the storage-medium access device 4 may read a finger position detection computer program from the storage medium 8 and transmit the read finger position detection computer program to the control unit 6.

The storage unit 5 includes, for example, a readable and writable volatile semiconductor memory and a readable and writable nonvolatile semiconductor memory. The storage unit 5 stores various application programs to be executed on the control unit 6 as well as various pieces of data. The storage unit 5 may store various pieces of data used for finger position detection processing, for example, parameters that represent a plurality of classifiers used to detect a finger position. In addition, the storage unit 5 may store a right-hand key table associated with identification information that represents a right hand and a left-hand key table associated with left hand identification information that represents a left hand. A key table is an example of a reference table detailing the correspondence, for each virtual key that may be pressed by a hand corresponding to identification information, between the virtual key, a finger position in the depth direction, and a finger position in the horizontal direction.

The control unit 6 includes either a single processor or a plurality of processors, and a peripheral circuit. The control unit 6 is connected to each unit in the mobile terminal 1 via a signal line and controls the mobile terminal 1. The control unit 6, which is an example of a finger position detection device, analyzes an image received from the image capturing unit 3 to thereby detect a finger that has pressed a virtual key of a virtual keyboard. The control unit 6 then detects the position of the finger in the depth direction and the horizontal direction, and specifies a virtual key corresponding to the detected position. Thereafter the control unit 6 determines that a key code corresponding to the specified virtual key has been input, and performs processing according to the key code and an application program that is being executed.

Figure 4:
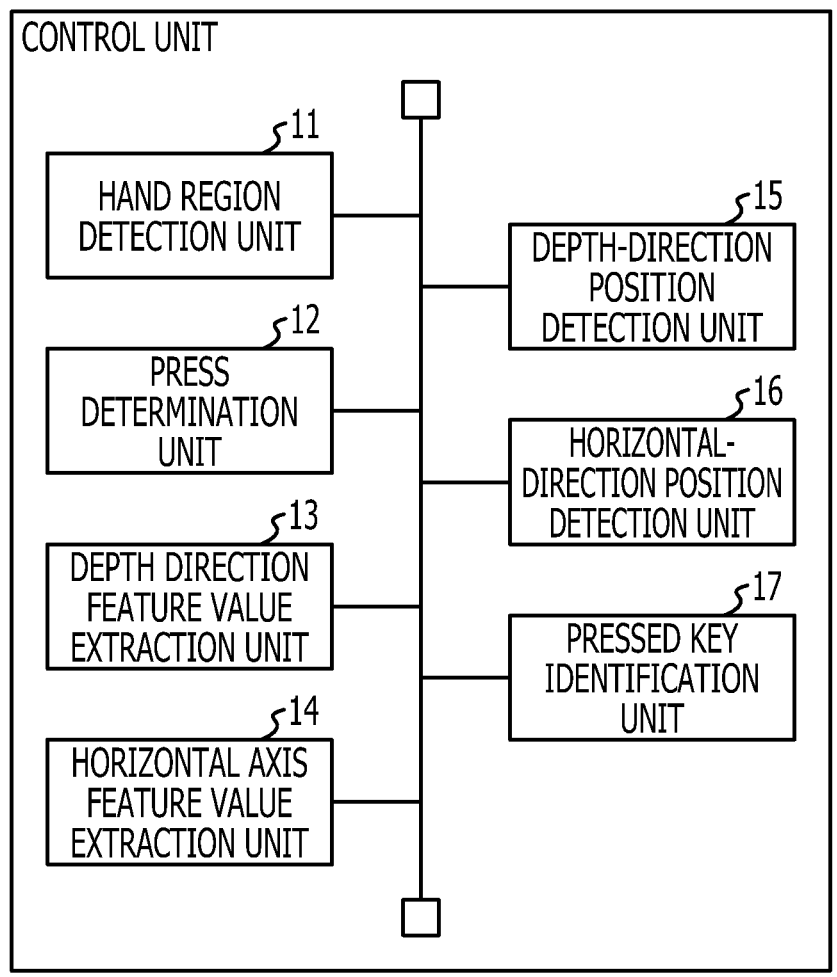
FIG. 4 is a functional block diagram of a control unit for performing finger position detection processing.

Components included in the control unit 6 for performing finger position detection processing will be described in detail below. FIG. 4 is a functional block diagram of the control unit 6 for performing finger position detection processing. The control unit 6 includes a hand region detection unit 11, a press determination unit 12, a depth-direction feature value extraction unit 13, a horizontal-axis feature value extraction unit 14, a depth-direction position detection unit 15, a horizontal-axis position detection unit 16, and a pressed key identification unit 17. The above units in the control unit 6 may, for example, be provided as functional modules realized by a computer program executed on the processor included in the control unit 6. Each unit may be separately included in the mobile terminal 1 as circuits or the units may be included in the mobile terminal 1 as a single integrated circuit having the functions of the units.

The hand region detection unit 11 extracts a hand region that includes at least one finger of a user from the image received from the image capturing unit 3. In this embodiment, since all fingers of the right and left hands may be used to press a virtual key, the hand region detection unit 11, for each of the left and right hands, extracts, as hand regions, regions that include all the fingers of the hand.

Accordingly, for example, when the received image is a color image in the RGB color system, the hand region detection unit 11 converts the color system of each pixel to the HSV color system or the HLS color system. The hand region detection unit 11 then extracts a pixel having a hue value that corresponds to a skin color (for example, a hue value in the range of 0° to 30°) from the image as a hand candidate pixel. The hand region detection unit 11 performs labeling processing on hand candidate pixels to set adjacent hand candidate pixels as a single hand candidate region. As a result, a plurality of hand candidate regions are obtained. The hand region detection unit 11 selects two hand candidate regions that are the largest and second largest among the hand candidate regions and extracts the circumscribed rectangles of the two selected hand candidate regions as hand regions. Alternatively, the hand region detection unit 11 may extract, as hand regions, each of two hand candidate regions, between which there is a difference, in the center of gravity in a height direction, which falls in a range assumed based on the positional relationship between the right and left hands.

The hand region detection unit 11 may extract a hand region with another hand region extraction method. For example, the hand region detection unit 11 may cause a hand region detector provided in advance to perform hand region detection with a plurality of correct sample images that include hands and a plurality of incorrect sample images that include no hand. A hand region detector may be, for example, an AdaBoost detector for receiving a Haar-like feature extracted from an image. In this case, an AdaBoost detector includes a plurality of weak classifiers and a single strong classifier. Each of the weak classifiers receives a Haar-like feature and outputs a determination value indicating a result of determination of whether a target region is a hand region. Different Haar-like features are input into each of the weak classifiers. As a result of learning, a Haar-like feature that is effective in determining whether a target region is a hand region is determined in advance. The strong classifier receives a determination value from each of the weak classifiers, compares a value obtained by weighted addition of the determination value with a weighting factor set for the weak classifier with a threshold value, and determines whether a target region is a hand region based on a result of the comparison. Alternatively, a plurality of cascaded AdaBoost detectors may be used as a hand region detector. The hand region detection unit 11 determines whether each partial region on an image is a hand region by extracting a Haar-like feature to be used in each weak classifier and inputting the extracted Haar-like feature into the corresponding weak classifier.

Figure 5:
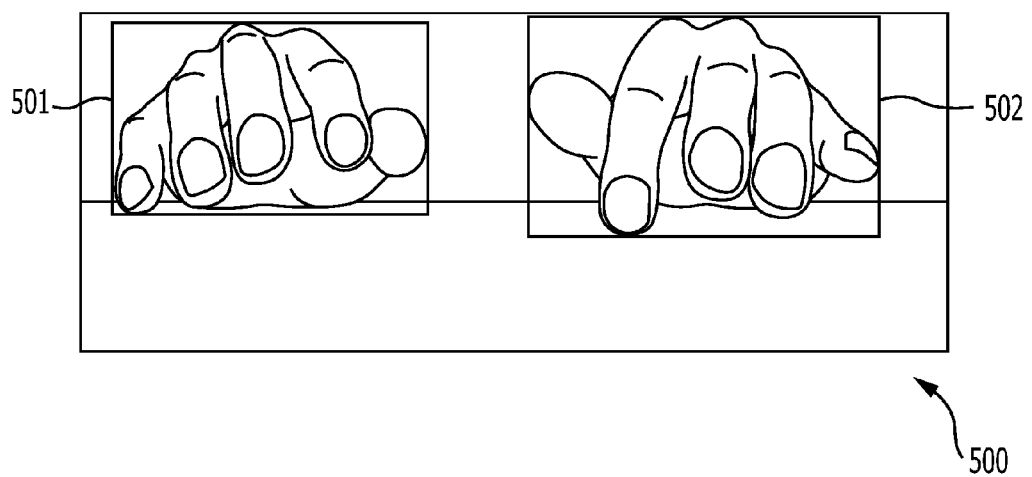
FIG. 5 is a diagram illustrating an example of a hand region.

FIG. 5 is a diagram illustrating an example of a hand region. In an image 500 illustrated in FIG. 5, two rectangular regions 501 and 502 each represent a hand region. Each hand region includes each of the fingers of the right or left hand. When a user moves the fingertip of one of the fingers downward, like when the user uses a real keyboard, it is determined that one of virtual keys of a virtual keyboard has been pressed. Thus, the user's hands are faced downwards. As a result, fingertips are included in the lower side of each hand region, and the root of the fingers is included in the upper side of each hand region in the captured image.

The hand region detection unit 11 extracts each hand region from an image. The hand region detection unit 11 may normalize the size of each hand region so that the number of pixels along the horizontal axis in the hand region becomes a given number. For example, the given number is set so that the range with which each finger may be detected in a normalized hand region falls within 150 to 300 pixels. In addition, the hand region detection unit 11 may normalize each hand region by multiplying the number of pixels in the vertical direction in the original hand region by the ratio ($N_{hn}/N_{ho}$) of the number of pixels $N_{hn}$ in the horizontal direction in the normalized hand region to the number of pixels $N_{ho}$ in the horizontal direction in the original hand region. A normalized hand region is hereinafter referred to as a hand image. The hand region detection unit 11 transfers a hand image corresponding to the left hand and a hand image corresponding to the right hand to the press determination unit 12.

The press determination unit 12 determines whether a user has pressed a virtual key. For the determination, for example, the press determination unit 12 compares the height of each of the two hand images that correspond to the left and right hands, that is, the distance from the upper end of the hand image to the lower end of the hand image, with a given distance M. When the height of the hand image is higher than the distance M, the press determination unit 12 determines that a hand corresponding to the hand image has pressed a virtual key that is able to be pressed. However, when the height of all of the hand images are equal to or lower than the distance M, the press determination unit 12 determines that no virtual key has been pressed. The distance M is experimentally determined in advance, and is set to, for example, a distance between the upper end of a hand image and the surface of a desk on which the mobile terminal 1 is placed. Alternatively, the distance M is set to an intermediate value between a hand image height average calculated from a plurality of hand image samples that each include a hand pressing a virtual key and hand image height average calculated from a plurality of hand image samples that each include a hand pressing no virtual key. Alternatively, the distance M may be set based on the distribution of heights of hand image samples when a virtual key is pressed and the distribution of heights of hand image samples when no virtual key is pressed so that the Mahalanobis distances from the distance M to the averages are equal to each other.

Figure 6A:
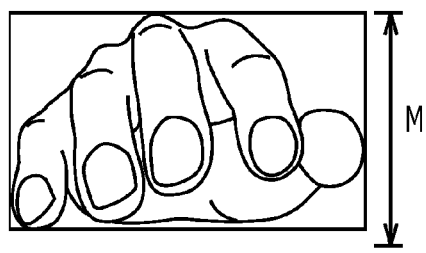
FIG. 6A is a diagram illustrating an example of a hand image when a user is not pressing a virtual key.
Figure 6B:
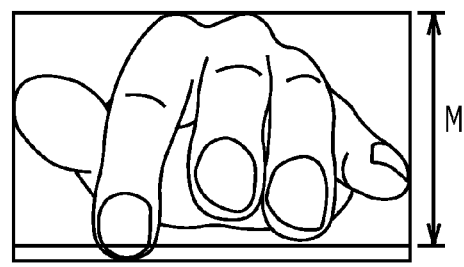
FIG. 6B is a diagram illustrating an example of a hand image when a user is pressing a virtual key.

FIG. 6A is a diagram illustrating an example of a hand image when a user does not press a virtual key. FIG. 6B is a diagram illustrating an example of a hand image when a user presses a virtual key. Referring to FIG. 6A, the lower end of a hand image 601 is located above a location that corresponds to the distance M from the upper end of the hand image 601. Accordingly, in this example, the press determination unit 12 determines that no virtual key has been pressed. However, referring to FIG. 6B, the lower end of a hand image 602 is below a location that corresponds to the distance M from the upper end of the hand image 602. Accordingly, in this example, the press determination unit 12 determines that a virtual key has been pressed.

Alternatively, the press determination unit 12 may determine that a user has pressed a virtual key when the ratio of the height of a hand image to the width of the hand image (that is, the distance between the left and right ends of the hand image) is greater than a given threshold value.

Alternatively, the press determination unit 12 may compare a distance M' from the upper end of an image (not hand image) obtained by the image capturing unit 3 and a distance y from the upper end of the image obtained by the image capturing unit 3 to the lower end of each hand region. When the distance y of a hand region is longer than the distance M', the press determination unit 12 may determine that a virtual key has been pressed. However, when the distance y for each hand regions is equal to or shorter than the distance M', the press determination unit 12 may determine that no virtual key has been pressed. In this case, for example, the distance M' may be logically determined based on an angle formed by the direction of the optical axis of the image capturing unit 3 when the mobile terminal 1 is placed on a desk and the surface of the desk, an estimated distance between the mobile terminal 1 and a fingertip, the focal length of the image capturing optical system in the image capturing unit 3, and the number of pixels in an image sensor. Alternatively, the distance M' may be experimentally calculated with an average of the distances y of a plurality of image samples that each include a hand pressing a virtual key and an average of the distances y of a plurality of image samples that each include a hand pressing no virtual key. Alternatively, the distance M' may be set in advance by a user via a touch panel (not illustrated).

When the press determination unit 12 determines that a virtual key has been pressed, the press determination unit 12 transmits a hand image corresponding to the hand that pressed a virtual key to the depth-direction feature value extraction unit 13 and the horizontal-axis feature value extraction unit 14. In addition, the press determination unit 12 notifies the pressed key identification unit 17 of identification information for the hand that is determined to have pressed a virtual key. However, when the press determination unit 12 determines that no virtual key has been pressed, the press determination unit 12 deletes the hand images.

The depth-direction feature value extraction unit 13 divides the hand image received from the press determination unit 12 into a plurality of first cells of a given size and extracts, from each of the first cells, a depth feature value representing the feature of a depth-direction position of a finger with which a virtual key has been pressed. In this embodiment, the depth-direction feature value extraction unit 13 calculates a histogram of oriented gradients (HOG) feature value as the depth feature value. A HOG is a cumulative value of luminance gradients in each of a plurality of angular directions in a first cell.

In this embodiment, the depth-direction feature value extraction unit 13 sets the number of pixels in the horizontal direction×the number of pixels in the vertical direction in a first cell to, for example, 10×10 or 20×20.

The depth-direction feature value extraction unit 13 calculates a gradient strength m(x, y) and a gradient direction θ(x, y) for each pixel included in a first cell with the following equations.

$$m(x, y) = \sqrt{f_x(x, y)^2 + f_y(x, y)^2}$$ (1)

$$\theta(x, y) = tan^{-1}\left(\frac{f_y(x, y)}{f_x(x, y)}\right)$$

$$f_x(x, y) = L(x+1, y) - L(x-1, y)$$

$$f_y(x, y) = L(x, y+1) - L(x, y-1)$$

In equations 1, (x, y) denotes coordinates of a target pixel in the horizontal and vertical directions, and L(x, y) denotes the luminance level of a pixel (x, y).

The depth-direction feature value extraction unit 13 divides the range of 0° to 360° into a plurality of partial angular ranges and calculates the total of gradient strengths m(x, y) of pixels that include a gradient direction θ(x, y) in each of the partial angular ranges. The total of gradient strengths in a single partial angular range in each first cell becomes a single HOG feature value. The partial angular range is set to, for example, 20°, 30°, or 45°. The depth-direction feature value extraction unit 13 may possibly use only the absolute value of a gradient direction. In this case, the depth-direction feature value extraction unit 13 may divide the range of 0° to 180° into a plurality of partial angular ranges and calculate the total of the gradient strengths m(x, y) for each partial angular range.

The depth-direction feature value extraction unit 13 may calculate, for each block that includes a plurality of first cells, the total of HOG feature values and divide each HOG feature value by the total to normalize the HOG feature value.

The depth-direction feature value extraction unit 13 outputs each HOG feature value to the depth-direction position detection unit 15 as a depth feature value.

The horizontal-axis feature value extraction unit 14 divides the hand image received from the press determination unit 12 into a plurality of second cells of a given size and extracts, from each of the second cells, a horizontal feature value that represents the feature of a horizontal-direction position of a finger with which a virtual key has been pressed.

However, the inventor found that the feature of a horizontal-direction position of a finger with which a virtual key was pressed was more affected by a small shape than the feature of a depth-direction position of the finger. The reason for this is as follows. Since a depth-direction position of a finger with which a virtual key has been pressed have an effect on the whole shape of a hand including the finger, the feature of a relatively large shape, which is less affected by noise, is preferably used as the depth feature value. However, since a horizontal-direction position of a finger with which a virtual key has been pressed is closely linked with the fingertip of the finger, the feature of a relatively small shape useful for the detection of the finger is preferably used as the horizontal feature value. Accordingly, the size of a second cell is set to a size smaller than that of a first cell. For example, the number of pixels in the horizontal direction x the number of pixels in the vertical direction in a second cell is set to, for example, 4×4 or 6×6.

The horizontal-axis feature value extraction unit 14 calculates an HOG feature value from each second cell in a similar fashion to the depth-direction feature value extraction unit 13. The horizontal-axis feature value extraction unit 14 may calculate, for each block that includes a plurality of second cells, the total number of HOG feature values and divide each HOG feature value by the total to normalize each HOG feature value. The horizontal-axis feature value extraction unit 14 outputs each HOG feature value to the horizontal-axis position detection unit 16 as a horizontal feature value.

The depth-direction position detection unit 15 detects the depth-direction position of a finger with which a virtual key has been pressed based on the depth feature values. In this embodiment, because a virtual keyboard has three key rows along the depth direction, the depth-direction position detection unit 15 has three classifiers that correspond to the key rows.

In this embodiment, as the classifier, a boost classifier such as an AdaBoost classifier or a Real AdaBoost classifier may be used. Alternatively, the classifier may be a support vector machine. An example in which Real AdaBoost classifiers are used will be described below.

Like an AdaBoost classifier, a Real AdaBoost classifier is a two-class classifier that includes a plurality of weak classifiers and a single strong classifier. Each weak classifier receives the HOG feature value of a partial angular range of one of a plurality of first cells and outputs a confidence representing a probability that a finger is placed at a depth-direction position that corresponds to the Real AdaBoost classifier. The strong classifier compares the total of confidences output from the weak classifiers to a threshold value $\lambda$. When the total of the confidences is greater than the threshold value $\lambda$, the strong classifier determines that a finger is placed at a depth-direction position in a key row corresponding to the Real AdaBoost classifier and outputs a positive value (for example +1). However, when the total of the confidences is less than or equal to the threshold value $\lambda$, the strong classifier determines that the finger is not placed at a depth-direction position in a key row that corresponds to the Real AdaBoost classifier and outputs a negative value (for example −1). The threshold value $\lambda$ is set to, for example, zero.

A HOG feature value input into each weak classifier and a confidence output from the weak classifier are determined by the following learning process, which is performed with a plurality of correct sample images and a plurality of incorrect sample images. A correct sample image includes a finger at a depth-direction position corresponding to a Real AdaBoost classifier that includes the weak classifier. An incorrect sample image includes a finger at a position different from the depth-direction position. The learning process may be performed by the control unit 6 in advance or by another apparatus, such as a classifier learning computer. An example in which a classifier learning computer (not illustrated) performs a learning process will be described below.

Step 1: First, a computer calculates the HOG feature value of each of a plurality of first cells in a each of a plurality of correct sample images and each of a plurality of incorrect sample images.

Step 2: The computer initializes weighting factors for each correct sample image and each incorrect sample image. For example, when the number of correct sample images is Np and the number of incorrect sample image is Nn, a weighting factor D1(i) (i=1, 2, . . . , Np) for an ith correct sample image is set to 1/Np and a weighting factor D1(j) (j=1, 2, . . . , Nn) for a jth incorrect sample image is set to 1/Nn.

Step 3: The computer, for each partial angular range in each first cell, divides a range of possible HOG feature values, that is, a range of possible cumulative values of gradient strengths, by B to set $BIN_j$ (j=1, 2, . . . , B). For example, B is set to 64.

The computer, for each $BIN_j$, calculates the total of weighting factors D1(i) that correspond to correct sample images included in the $BIN_j$ as an occurrence probability $W^+_j$, and calculates the total of weighting factors D1(i) that correspond to incorrect sample images included in the $BIN_j$ as an occurrence probability $W^-_j$. For example, when, in an lth partial angular range in a kth first cell, there are $\alpha$ correct sample images that have HOG feature values corresponding to $BIN_j$ and $\beta$ incorrect sample images that have HOG feature values corresponding to $BIN_j$, $W^+_j = \alpha D1(i)$ and $W^-_j = \beta D1(i)$ are obtained.

Step 4: The computer calculates an evaluation value z for all partial angular ranges in all first cells based on a Bhattacharyya distance as is represented by the following equation.

$$z = 1 - \sum_{j=1}^{\beta} \sqrt{W^j_+ W^j_-} \qquad (2)$$

The evaluation value z represents the degree of difference between the distribution of HOG feature values of correct sample images and the distribution of HOG feature values of incorrect sample images. The larger the evaluation value z, the higher the degree of difference. Accordingly, the HOG feature value of a partial angular range of a first cell that corresponds to the evaluation value z is useful to detect the depth-direction position of a finger.

Step 5: The computer selects the HOG feature value of a partial angular range in a first cell that has the maximum evaluation value as a feature value to be input into a single weak classifier. A confidence output from the weak classifier is represented by the following equation.

$$h_m(x) = \frac{1}{2} \ln \frac{W^j_+ + \varepsilon}{W^j_- + \varepsilon} \qquad (3)$$

In equation 3, $h_m(x)$ denotes a confidence, m denotes the identification number of a weak classifier (m=1, 2, . . . , M where M is the total number of weak classifiers included in a Real AdaBoost classifier), and x denotes the identification number of a partial angular range of a first cell having the maximum evaluation value. For example, when an lth partial angular range (l=1, 2, . . . , L where L is the number of partial angular ranges set in a single first cell) in a kth first cell (k=1, 2, . . . , K where K is the number of first cells included in a hand image) has the maximum evaluation value, x=(k−1)*L+l is obtained. In equation 3, E represents a constant with which the value of a in a natural logarithm ln(a) on the right side of equation 3 does not become zero or infinity, and is set to, for example, 0.0000001. In equation 3, as described previously, $W^j_+$ and $W^j_-$ denote the correct sample image occurrence probability and the incorrect sample image occurrence probability, respectively, which are calculated for each BIM. For example, when the HOG feature value of a partial angular range with an identification number x in a first cell, which has been calculated by the depth-direction feature value extraction unit 13, is included in the third BINp, an mth weak classifier outputs $1/2 \ln((W_+^3 + \varepsilon)/(W_-^3 + \varepsilon))$ as a confidence $h_m(x)$.

Step 6: The computer, based on the total of confidences output from the weak classifiers that have received selected feature values, determines whether a result of determination of a finger position is correct for each correct sample image and each incorrect sample image. The computer increases a weighting factor for a correct sample image or an incorrect sample image for which an incorrect determination result has been obtained. Subsequently, the computer repeatedly performs the process subsequent to step 3 until the percentage of correct answers for correct sample images and incorrect sample images reaches a given value.

The depth-direction position detection unit 15 inputs, into each of three classifiers that correspond to the key rows, a depth feature value to be used in the classifier. The depth-direction position detection unit 15 then determines that a finger is placed in a key row corresponding the classifier that output a positive value, out of the three classifiers.

When a plurality of classifiers output positive values, the depth-direction position detection unit 15 may determine that a finger is placed in a key row corresponding to a classifier that has the maximum total of confidences. The depth-direction position detection unit 15 outputs depth-direction position information, which indicates the key row, to the pressed key identification unit 17.

The horizontal-axis position detection unit 16 detects the horizontal-direction position of a finger with which a virtual key has been pressed based on horizontal feature values. In this embodiment, since a virtual keyboard has five virtual keys in each key row along the horizontal direction, the horizontal-axis position detection unit 16 includes five classifiers corresponding to the positions of the virtual keys.

Like the depth-direction position detection unit 15, the horizontal-axis position detection unit 16 may include boost classifiers or support vector machines as the classifiers. In this embodiment, the classifiers included in the horizontal-axis position detection unit 16 are also Real AdaBoost classifiers.

The horizontal-axis position detection unit 16 inputs, into each of the five classifiers that correspond to the positions of the virtual keys, a horizontal feature value to be used in the classifier. The horizontal-axis position detection unit 16 then determines that a finger is placed at a horizontal-direction position corresponding to, out of the five classifiers, a classifier that has output a positive value.

When a plurality of classifiers output positive values, the horizontal-axis position detection unit 16 may determine that a finger is placed at a horizontal-direction position corresponding to a classifier that has the maximum total of confidences. The horizontal-axis position detection unit 16 outputs horizontal-axis position information, which indicates the horizontal-direction position, to the pressed key identification unit 17.

The pressed key identification unit 17 specifies a pressed virtual key based on hand identification information, the depth-direction position information, and the horizontal-axis position information. For example, the pressed key identification unit 17 reads a key table associated with the hand identification information from the storage unit 5. The pressed key identification unit 17 refers to the key table to specify a virtual key that corresponds to the depth-direction finger position represented by the depth-direction position information and the horizontal-direction finger position represented by the horizontal-axis position information. For example, when the hand identification information indicates the left hand, the horizontal-direction position is the second position from the left, and the depth-direction position is the front row, the pressed key identification unit 17 determines that the virtual key W as illustrated in FIG. 2 has been pressed. When the hand identification information indicates the right hand, the horizontal-direction position is the third position from the left, and the depth-direction position is the second row, the pressed key identification unit 17 determines that the virtual key of K as illustrated in FIG. 2 has been pressed.

The pressed key identification unit 17 refers to the key code table that details the correspondence between a virtual key and a key code, which is stored in the storage unit 5, determines a key code that corresponds to the virtual key determined to be pressed as input information, and returns the key code to the control unit 6.

FIG. 7 is a flowchart illustrating a finger position detection process performed by the control unit 6. The control unit 6 performs the finger position detection process each time the control unit 6 receives an image that includes a plurality of fingers from the image capturing unit 3.

The hand region detection unit 11 detects a hand region that includes the left hand and a hand region that includes the right hand from the image received from the image capturing unit 3 (step S101). The hand region detection unit 11 extracts each hand region from the image and normalizes the sizes of the hand regions to generate a left-hand image and a right-hand image (step S102). The hand region detection unit 11 transfers the hand images to the press determination unit 12.

The press determination unit 12 determines whether a virtual key has been pressed based on the height of each hand image (step S103). When it is determined that no virtual key has been pressed (No in step S103), the press determination unit 12 deletes each hand image. The control unit 6 then ends the finger position detection process.

However, when it is determined that a virtual key has been pressed (Yes in step S103), the press determination unit 12 notifies the pressed key identification unit 17 of identification information about a hand corresponding to a pressed virtual key and transfers the hand image of the hand to the depth-direction feature value extraction unit 13 and the horizontal-axis feature value extraction unit 14.

The depth-direction feature value extraction unit 13 divides the hand image corresponding to a hand with which a virtual key has been pressed into a plurality of first cells and extracts a depth feature value from each of the first cells (step S104). The depth-direction feature value extraction unit 13 transfers the depth feature values to the depth-direction position detection unit 15. The horizontal-axis feature value extraction unit 14 divides the hand image corresponding to the hand with which the virtual key has been pressed into a plurality of second cells and extracts a horizontal feature value from each of the second cells (step S105). The size of the second cell is smaller than that of the first cell. The horizontal-axis feature value extraction unit 14 transfers the horizontal feature values to the horizontal-axis position detection unit 16.

The depth-direction position detection unit 15 inputs the depth feature values into classifiers that each correspond to one of a plurality of key rows of a virtual keyboard, and thereby detects the depth-direction position of a finger that has pressed a virtual key (step S106). The depth-direction position detection unit 15 transfers depth-direction position information indicating the position of the finger in the depth direction to the pressed key identification unit 17. The horizontal-axis position detection unit 16 inputs the horizontal feature values into classifiers that each correspond to a position of one of a plurality of virtual keys included in a single key row and thereby detects the horizontal-direction position of the finger with which the virtual key has been pressed (step S107). The horizontal-axis position detection unit 16 transfers horizontal position information indicating the position of the finger in the horizontal direction to the pressed key identification unit 17.

The pressed key identification unit 17 refers to a reference table that corresponds to the hand identification information received from the press determination unit 12, and specifies a virtual key that corresponds to a depth-direction finger position represented by the depth-direction position information and a horizontal-direction finger position represented by the horizontal position information (step S108). The pressed key identification unit 17 then returns a key code corresponding to the specified virtual key to the control unit 6. Thereafter, the control unit 6 ends the finger position detection process.

As described above, a mobile terminal that includes a finger position detection device may detect the horizontal-direction position and depth-direction position of a finger that has pressed a virtual key based on an image of a user's hand captured from in front of the fingertips.

In a modification, the depth-direction feature value extraction unit 13 and the horizontal-axis feature value extraction unit 14 may extract a depth feature value and a horizontal feature value, respectively, from different partial regions in a hand region that corresponds to a finger that has been determined to have pressed a virtual key by the press determination unit 12.

Figure 8A:
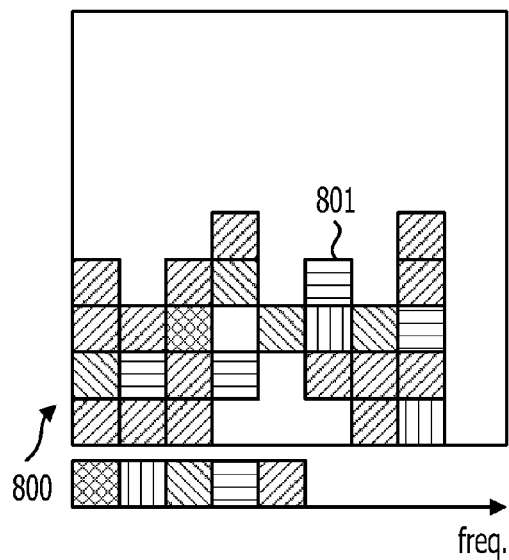
FIGS. 8A to 8C are each a diagram illustrating the distributions of HOG feature values in a hand image, where the HOG feature values are used by classifiers included in a depth-direction position detection unit corresponding to the first to third key rows along a depth direction.
Figure 8B:
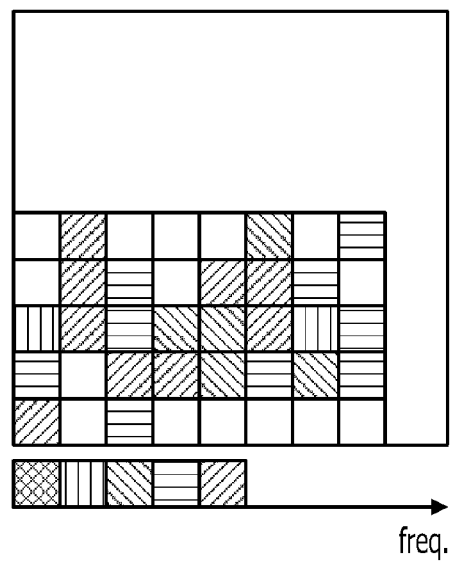
Figure 8C:
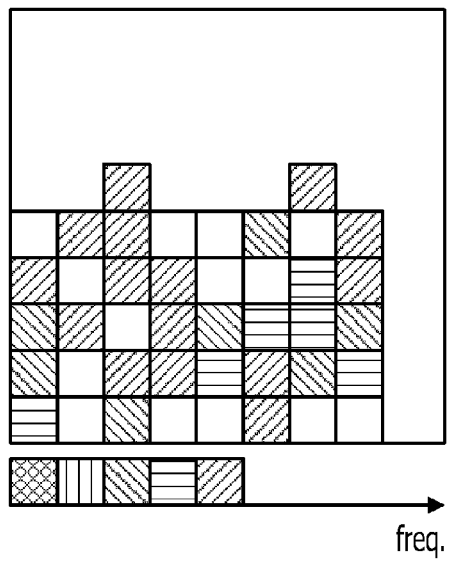
Figure 9A:
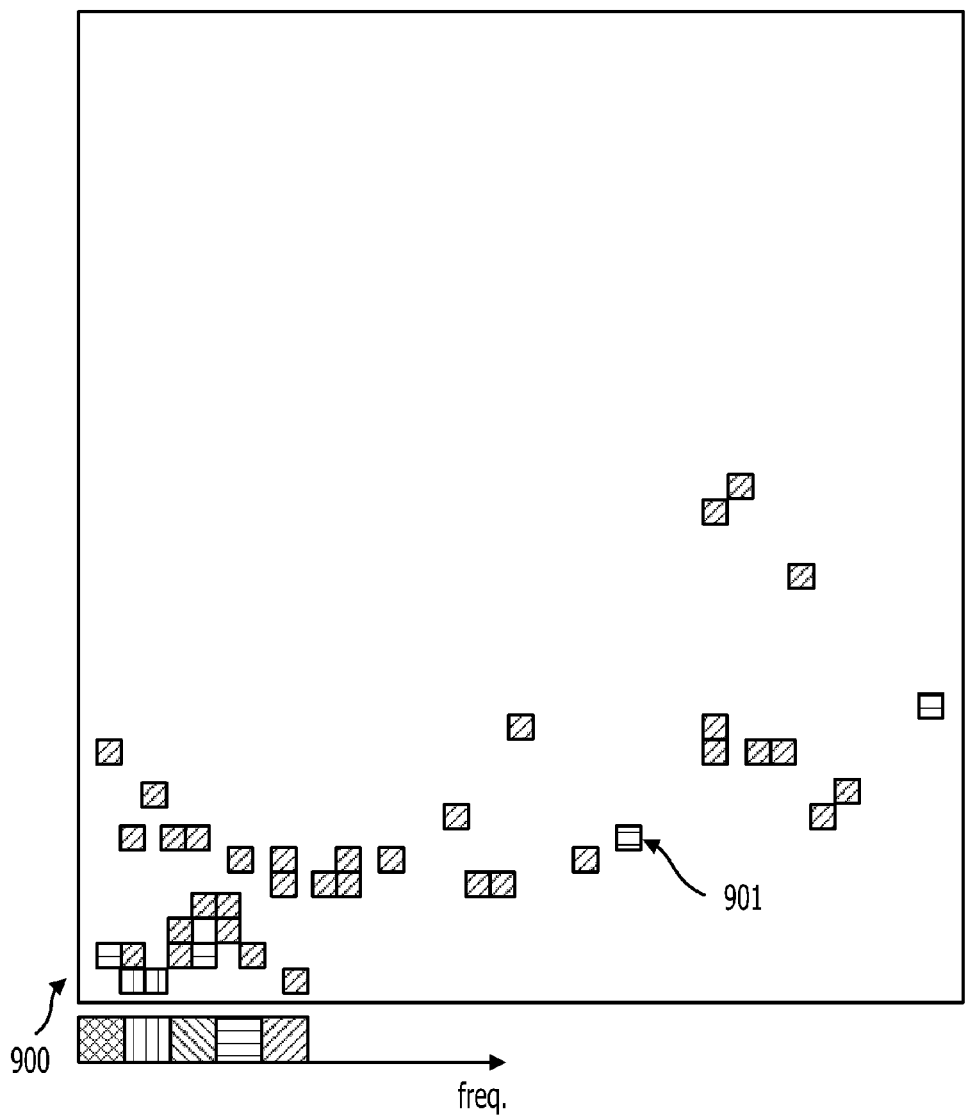
FIGS. 9A to 9E are each a diagram illustrating the distributions of HOG feature values in a hand image, where the HOG feature values are used by classifiers included in a horizontal-axis position detection unit corresponding to the first to fifth virtual keys from the right end.
Figure 9B:
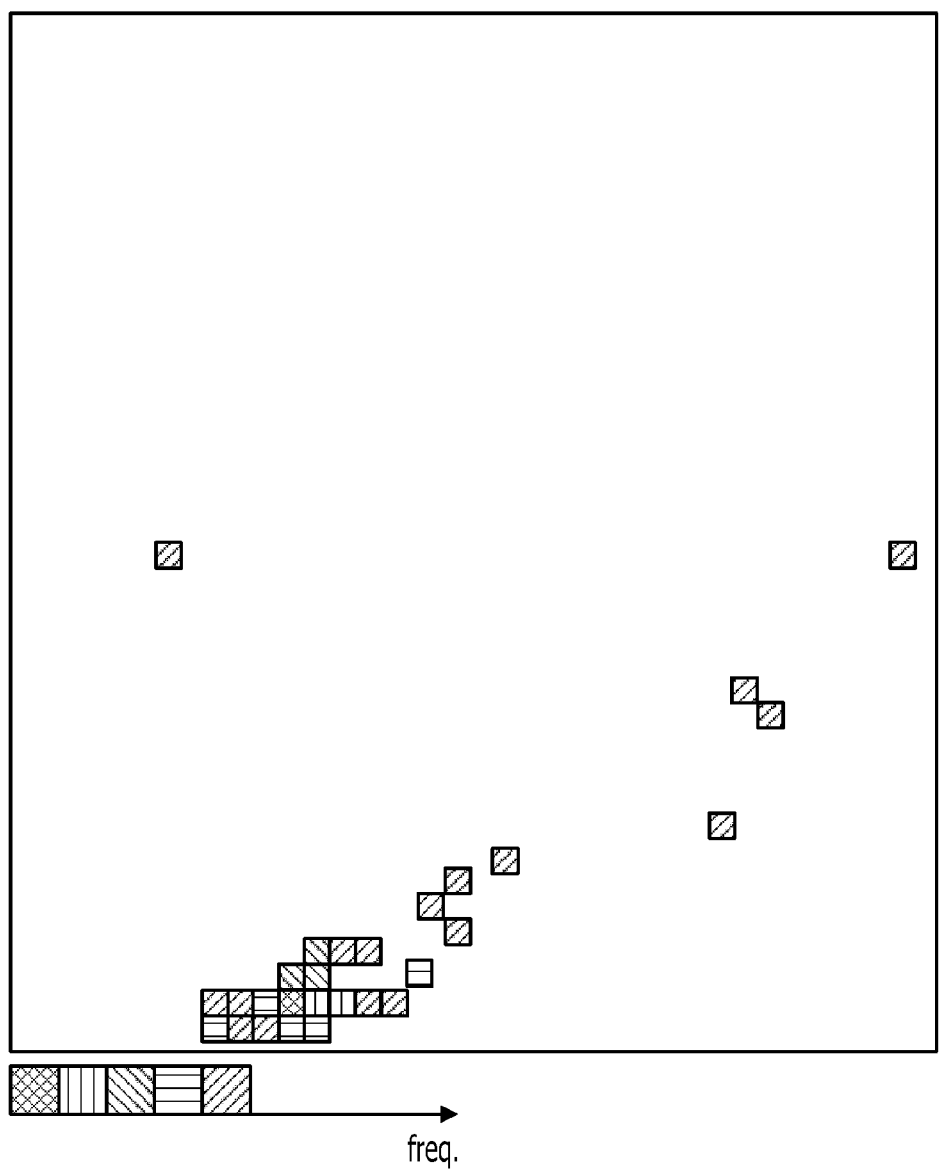
Figure 9C:
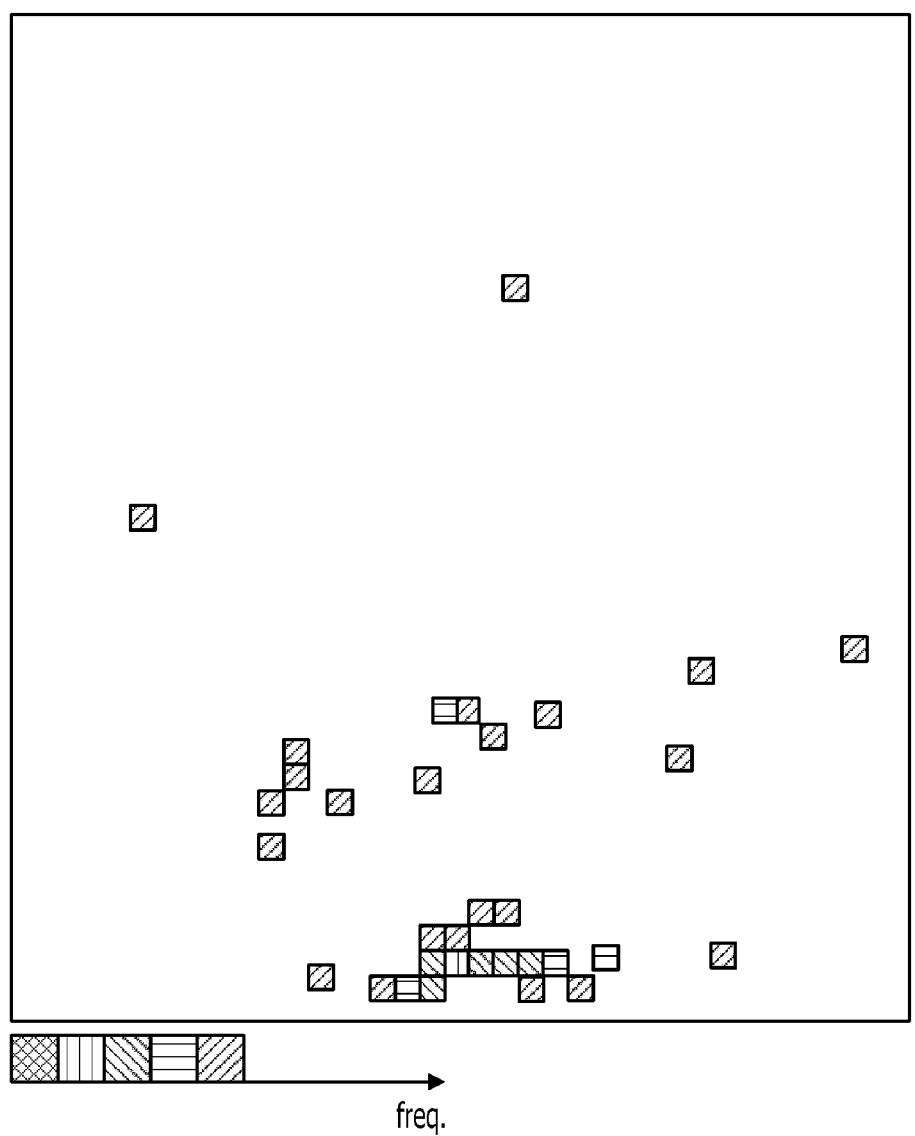
Figure 9D:
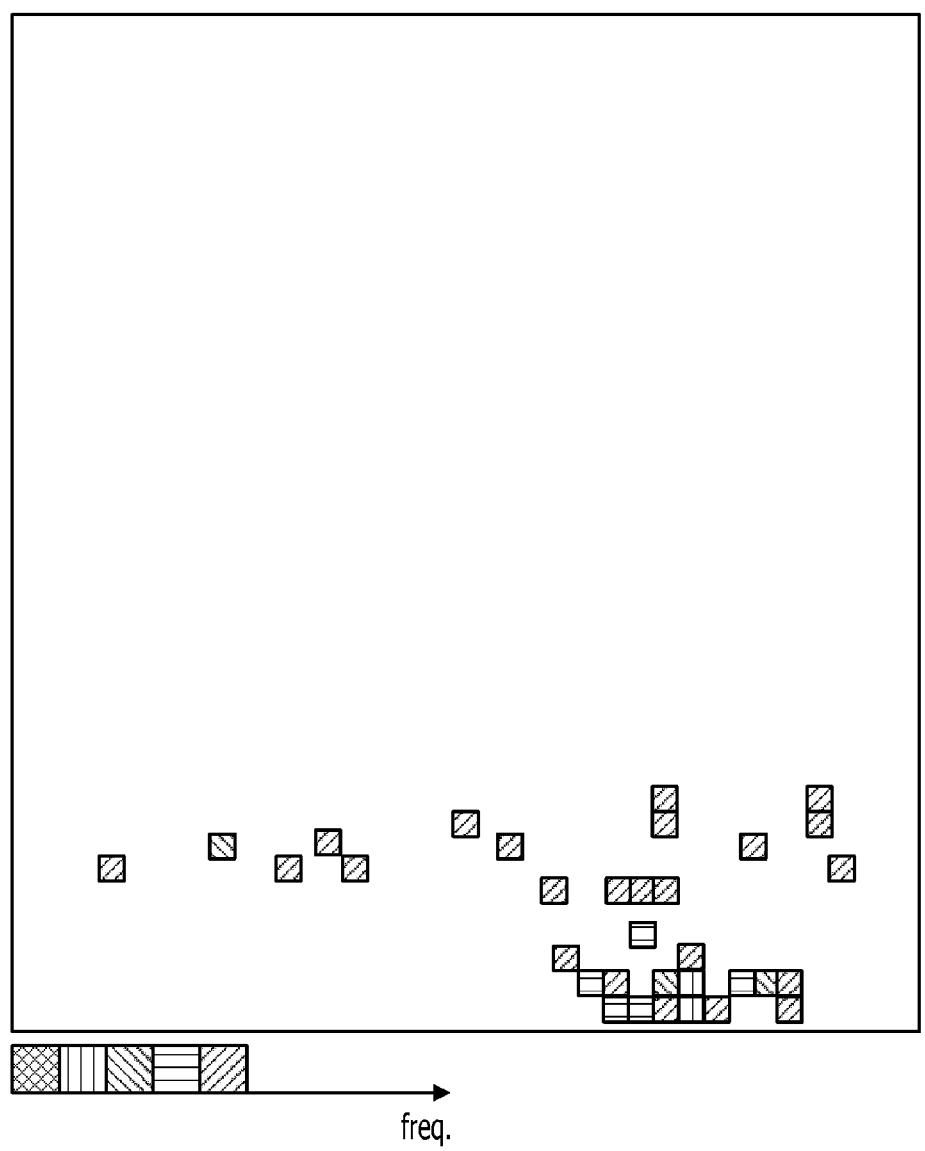
Figure 9E:
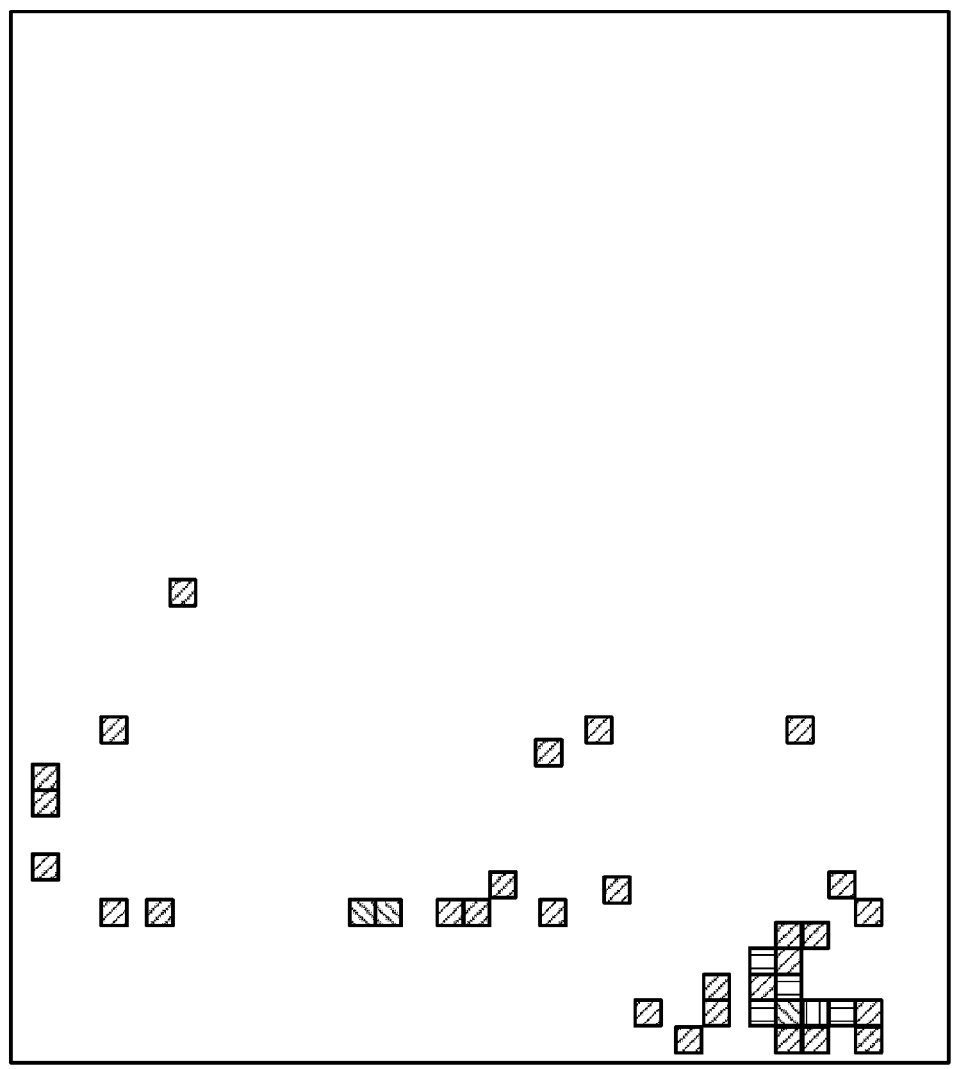

FIGS. 8A to 8C are diagrams that each illustrate the distributions of HOG feature values in a hand image which are used by classifiers included in the depth-direction position detection unit 15 corresponding to the first to third key rows along a depth direction, respectively. Each rectangular region 801 in a hand image 800 corresponds to a single first cell. The density of the first cell 801 is equivalent to the number of HOG feature values of the first cell 801 used. The higher frequency of the first cell 801, the larger the number of HOG feature values of the first cell 801 used. As illustrated in FIGS. 8A to 8C, the HOG feature value of cell at the lower end of the hand image 800 are rarely used and the HOG feature value of cell in rows other than the lowermost row are frequently used as the depth feature value.

FIGS. 9A to 9E are diagrams that each illustrate distributions of HOG feature values in a hand image that is used by classifiers included in the horizontal-axis position detection unit 16 corresponding to the first to fifth virtual keys from the right end, respectively. Each rectangular region 901 in a hand image 900 corresponds to a single second cell. The density of the second cell 901 is equivalent to the number of HOG feature values of the second cell 901 used. The higher frequency of the second cell 901, the larger the number of HOG feature values of the second cell 901 used. As illustrated in FIGS. 9A to 9E, the HOG feature value of each cell near the lower end of the hand image 900 is frequently used as the horizontal feature value, while the HOG feature value of each cell on the upper side of the hand image 900 is rarely used.

Thus, in a hand image, a position from which the depth feature value is frequently extracted and a position from which the horizontal feature value is frequently extracted differ from each other. The depth-direction feature value extraction unit 13 may divide possibly only a first partial region above a given position in the height direction of a hand image into a plurality of first cells and extract the depth feature value from each of the first cells.

The horizontal-axis feature value extraction unit 14 may divide possibly only a second partial region below a given position in the height direction of a hand image into a plurality of second cells and extract the horizontal feature value from each of the second cells.

Figure 10:
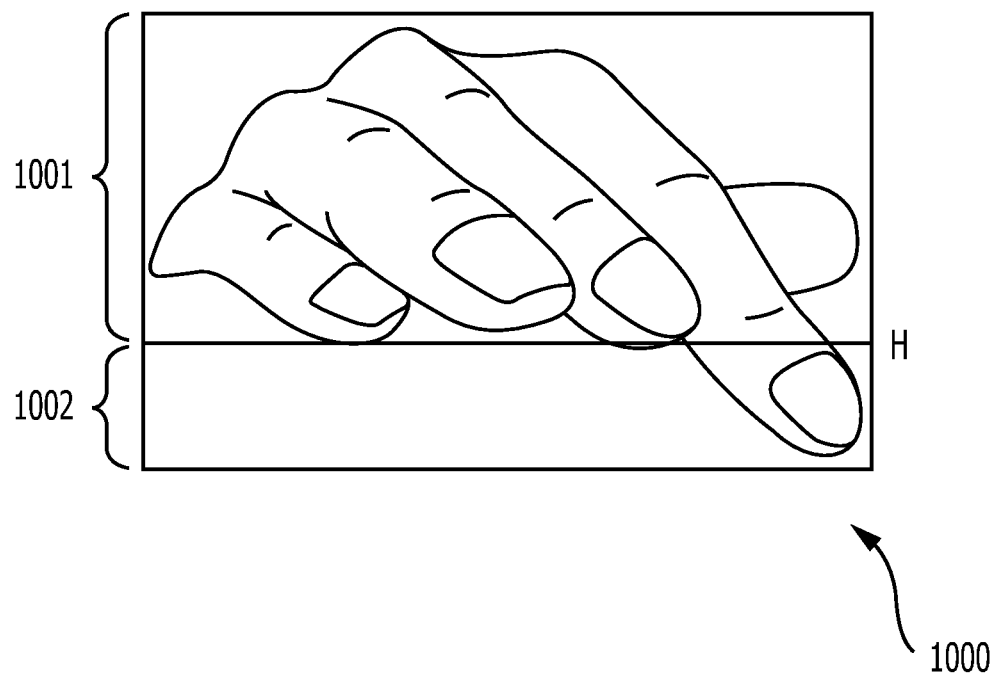
FIG. 10 is a diagram illustrating the positional relationship between first and second partial regions in a hand image.

FIG. 10 is a diagram illustrating the positional relationship between first and second partial regions in a hand image. As illustrated in FIG. 10, a hand image 1000 is divided into a first partial region 1001, which is an upper part above a horizontal line at a given height H, and a second partial region 1002, which is a lower part below the horizontal line. The depth feature value is extracted from the first partial region 1001, and the horizontal feature value is extracted from the second partial region 1002.

The given height H is, for example, set to a height at which the ratio of the number of HOG feature values in a partial region above the height H to the total number of HOG feature values used by classifiers to detect a depth-direction position, and the ratio of the number of HOG feature values in a partial region below the height H to the total number of HOG feature values used by classifiers to detect a horizontal-direction position are substantially equal to each other, and is set to, for example, a position that is up from the lower end of a hand image by 20 pixels.

Thus, by limiting a region from which a depth feature value is extracted and a region from which a horizontal feature value is extracted, the amount of computation in the finger position detection processing may be reduced. For example, when the depth feature value and the horizontal feature value are extracted from the whole of a hand image, the total number of cells Num0 becomes Num0=S/x+S/y where S denotes the total number of pixels included in the hand image, y denotes the number of pixels included in the first cell, and x denotes the number of pixels included in the second cell. However, when the ratio of the number of pixels included in the first partial region to the number of pixels included in the second partial region is n:m, the total number of cells Num1 from which the depth feature value and the horizontal feature value are extracted becomes Num1={(S*m)/x+(S*n)/y}. Therefore, the ratio r of the total number of cells Num1 to the total number of cells Num0 becomes (m/x+n/y)/(1/x+1/y). The amount of computation is reduced in accordance with the ratio r.

In another modification, the depth-direction feature value extraction unit 13 may extract an edge of orientation histograms (EOH) feature value from each of a plurality of first cells instead of an HOG feature value. The depth-direction position detection unit 15 may detect the position of a finger in the depth direction based on the EOH feature value extracted from each of the first cells. The horizontal-axis feature value extraction unit 14 may similarly extract an EOH feature value from each of a plurality of second cells instead of an HOG feature value. The horizontal-axis position detection unit 16 may detect the position of a finger in the horizontal direction based on the EOH feature value extracted from each of the second cells.

The control unit may include a learning unit for updating a classifier included in the depth-direction position detection unit 15 or the horizontal-axis position detection unit 16.

Figure 11:
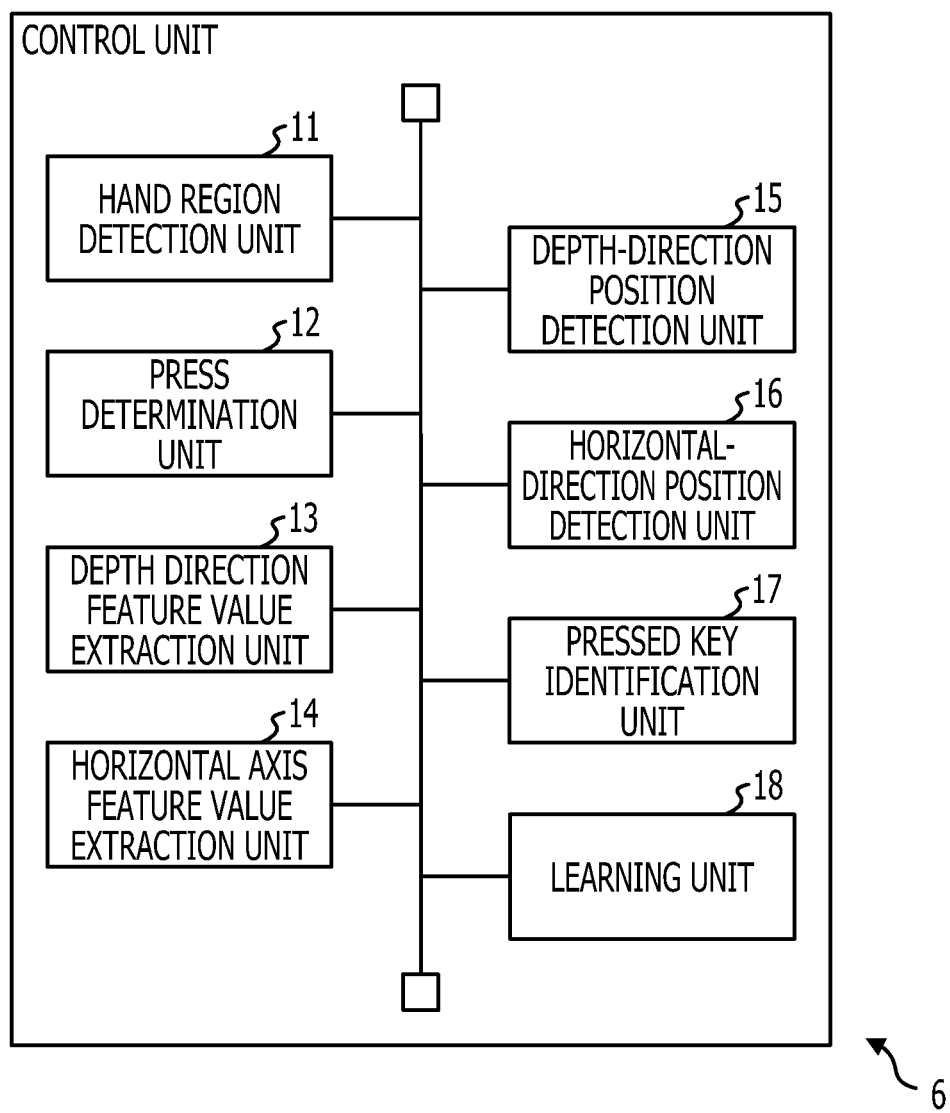
FIG. 11 is a functional block diagram of a control unit, according to a second embodiment, that performs finger position detection processing.

FIG. 11 is a functional block diagram of the control unit 6 according to a second embodiment that performs finger position detection processing. The control unit 6 includes a hand region detection unit 11, a press determination unit 12, a depth-direction feature value extraction unit 13, a horizontal-axis feature value extraction unit 14, a depth-direction position detection unit 15, a horizontal-axis position detection unit 16, a pressed key identification unit 17, and a learning unit 18.

The difference between the first and second embodiments is that the control unit 6 includes the learning unit 18. Accordingly, descriptions will be given for the learning unit 18 as well as areas related thereto.

In this embodiment, the storage unit 5 in the mobile terminal 1 stores a plurality of correct sample images and a plurality of incorrect sample images for each classifier.

The learning unit 18 learns each classifier when the mobile terminal 1 is turned either off or on. When, for example, each classifier is a Real AdaBoost classifier, the learning unit 18 performs the above-described learning process from steps 1 to 6 for each classifier to be updated. The learning unit 18 stores, in the storage unit 5, a plurality of parameters that specify the classifier along with the identification number of the classifier. For example, the parameters include the identification number of a partial angular range whose feature value is to be input into a weak classifier, the identification number of a cell that includes the partial angular range, and the occurrence probabilities $W_+^j$ and $W_-^j$.

The control unit 6 may store a hand image obtained when it is determined that a key has been pressed in the storage unit 5 as a correct sample image for both a classifier corresponding to the horizontal-direction position of a finger with which the key has been pressed and a classifier corresponding to the depth-direction position of the finger. In addition, the control unit 6 may store a hand image that is obtained when it is determined that a key has been pressed in the storage unit 5 as an incorrect sample image for both a classifier corresponding to a horizontal-direction position different from that of a finger with which the key has been pressed and a classifier corresponding to a depth-direction position different from that of the finger. Thus, in the mobile terminal 1, the control unit 6 may update each classifier on a user-by-user basis by adding a correct sample image and an incorrect sample image.

The finger position detection processing performed by the control unit 6 may be applied to a situation other than an input device with a virtual keyboard. For example, the control unit 6 may detect the horizontal-direction position and depth-direction position of a certain finger from a plurality of images of a user's hand, which have been periodically photographed, by performing the finger position detection processing. The control unit 6 may specify input information based on the change in the horizontal-direction position and the depth-direction position over time. For example, when the change over time is the stroke order of a given character, the control unit 6 may determine that the given character has been input. In this case, a reference table in which the change in the horizontal-direction finger position and the depth-direction finger position over time and input information are associated is created in advance and is stored in the storage unit 5. The control unit 6 may specify information that corresponds to the change in the horizontal-direction finger position and the depth-direction finger position over time by referring to the reference table.

A finger position detection device may be included in various apparatuses, other than a mobile terminal, that have a camera. A computer program for causing a computer to perform each function related to the finger position detection processing performed by a control unit in a mobile terminal according to the above-described embodiment or a mobile terminal that is a modification may be recorded in a computer-readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A finger position detection device comprising:
a processor; and
a memory which stores a plurality of instructions, which when executed by the processor, cause the processor to execute,
detecting a hand region that includes a plurality of fingers from an image captured by an image capturing unit that captures an image of the plurality of fingers from in front of the fingers;
dividing a first region that is at least a part of the hand region into a plurality of first cells of a first size and extracting, from each of the plurality of first cells, a first feature value that represents a feature of a position of one of the plurality of fingers in a depth direction with respect to the image capturing unit;
dividing a second region that is at least a part of the hand region into a plurality of second cells of a second size smaller than the first size and extracting, from each of the plurality of second cells, a second feature value that represents a feature of a position of one of the plurality of fingers in a finger arrangement axis along which the plurality of fingers are arranged;
detecting a finger position in the depth direction by inputting the first feature value into a first classifier that represents a relationship between the first feature value and a finger position in the depth direction; and
detecting a finger position in the finger arrangement axis by inputting the second feature value into a second classifier that represents a relationship between the second feature value and a finger position in the finger arrangement axis.

2. The finger position detection device according to claim 1, further comprising:
a first-direction feature value extraction unit that sets a region above a given position in a height direction in the hand region as the first region, and
a second-direction feature value extraction unit that sets a region at or below the given position in the hand region as the second region.

3. The finger position detection device according to claim 1, wherein the first feature value is a cumulative value of luminance gradients in each of a plurality of directions in each of the plurality of first cells.

4. The finger position detection device according to claim 1, wherein the second feature value is a cumulative value of luminance gradients in each of a plurality of directions in each of the plurality of second cells.

5. The finger position detection device according to claim 1, wherein the first classifier and the second classifier are boost classifiers.

6. A finger position detection method comprising:
detecting, by a computer processor, a hand region that includes a plurality of fingers from an image captured by an image capturing unit that captures an image of the plurality of fingers from in front of the fingers;
dividing a first region that is at least a part of the hand region into a plurality of first cells of a first size and extracting, from each of the plurality of first cells, a first feature value that represents a feature of a position of one of the plurality of fingers in a depth direction with respect to the image capturing unit;
dividing a second region that is at least a part of the hand region into a plurality of second cells of a second size smaller than the first size and extracting, from each of the plurality of second cells, a second feature value that represents a feature of a position of one of the plurality of fingers in a finger arrangement axis along which the plurality of fingers are arranged;

detecting a finger position in the depth direction by inputting the first feature value into a first classifier that represents a relationship between the first feature value and a finger position in the depth direction; and detecting a finger position in the finger arrangement axis by inputting the second feature value into a second classifier that represents a relationship between the second feature value and a finger position in the finger arrangement axis.

7. The finger position detection method according to claim 6, wherein, in the extracting the first feature value, a region above a given position in a height direction in the hand region is set as the first region, and in the extracting the second feature value, a region at or below the given position in the hand region is set as the second region.

8. The finger position detection method according to claim 6, wherein the first feature value is a cumulative value of luminance gradients in each of a plurality of directions in each of the plurality of first cells.

9. The finger position detection method according to claim 6, wherein the second feature value is a cumulative value of luminance gradients in each of a plurality of directions in each of the plurality of second cells.

10. The finger position detection method according to claim 6, wherein the first classifier and the second classifier are boost classifiers.

* * * * *